Figure 1:
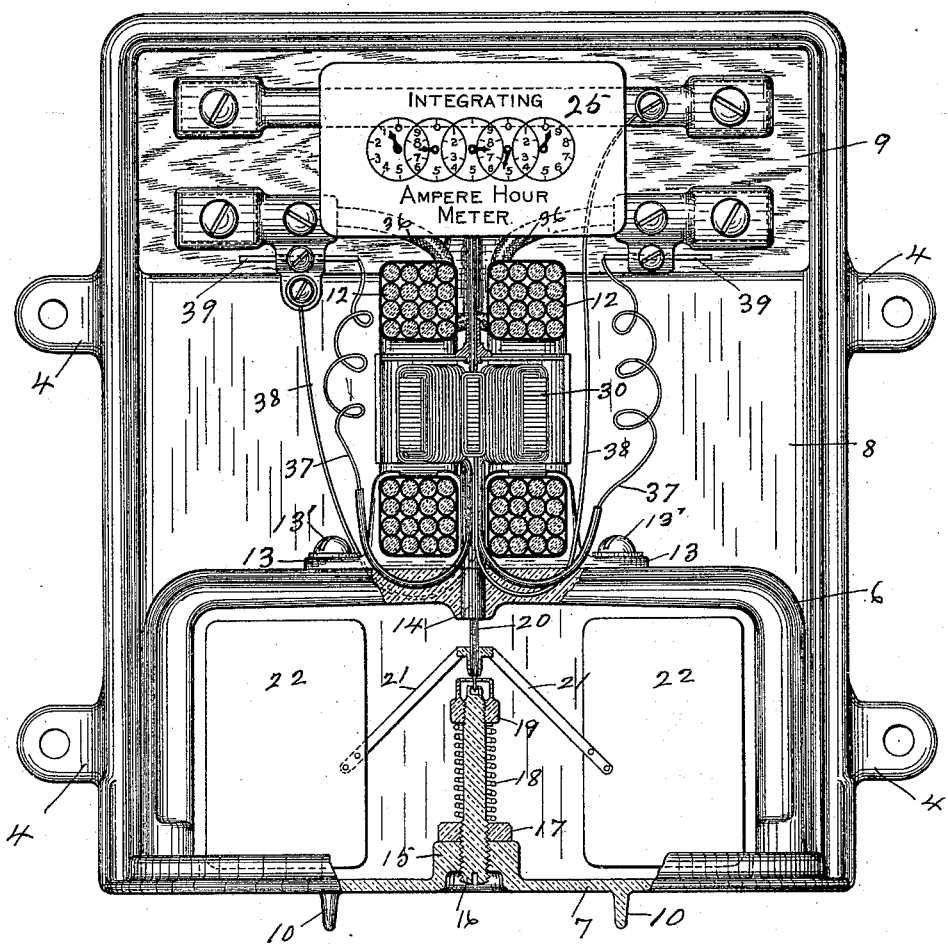

(No Model.) 5 Sheets—Sheet 1.

T. DUNCAN.
ELECTRIC METER.

No. 604,462. Patented May 24, 1898.

Witnesses
A. L. Hadley
N. A. Duncan

Thomas Duncan Inventor
By his Attorneys Chapin & Denny (No Model.)

T. DUNCAN.
ELECTRIC METER.

No. 604,462. Patented May 24, 1898.

Witnesses
A. L. Hadley
N. A. Duncan

Thomas Duncan Inventor
By his Attorneys Chapin & Denny (No Model.) 5 Sheets—Sheet 4.

T. DUNCAN.
ELECTRIC METER.

No. 604,462. Patented May 24, 1898.

Witnesses
A. L. Hadley
N. A. Duncan

Thomas Duncan Inventor
By his Attorneys Chapin & Denny (No Model.) 5 Sheets—Sheet 5.

T. DUNCAN.
ELECTRIC METER.

No. 604,462. Patented May 24, 1898.

Witnesses
A. L. Hadley
N. A. Duncan

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 604,462, dated May 24, 1898.

Application filed August 11, 1897. Serial No. 647,809. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric meters specially designed and adapted for coulomb-meters for alternating currents, and is designed as an improvement upon that form of meter shown and claimed in certain prior pending applications in which magnetic fields of differing phase are set up by a series of coils, part of which are arranged within and part without the cylindrical rotary armature.

The object of my invention is to provide a simple, economical, and reliable means for overcoming the inertia and friction of the operative parts of a meter in starting on very low loads, as on one or two lamps, in which case, as is well known, the said friction is great as compared with the starting torque.

In said pending applications I have broadly claimed shunt-coils or coils operated in multiple upon the circuit whose axis is inclined to the axes of the series coils to prevent mutual induction. I have also in said applications described and claimed, in conjunction with said shunt-coils, an impedance-coil similar in all respects to the one shown in this application.

My present invention consists in providing a supplementary or auxiliary starting coil or coils for meters of the class specified, so constructed and arranged as to tend to create a torque almost sufficient to start the rotary armature or barely sufficient to overcome the friction and inertia and yet be free from any mutual inductive action with the adjacent field-coils.

The novel feature of my invention consists in the application of my starting device to induction-meters and certain details of construction hereinafter described.

Figure 2:
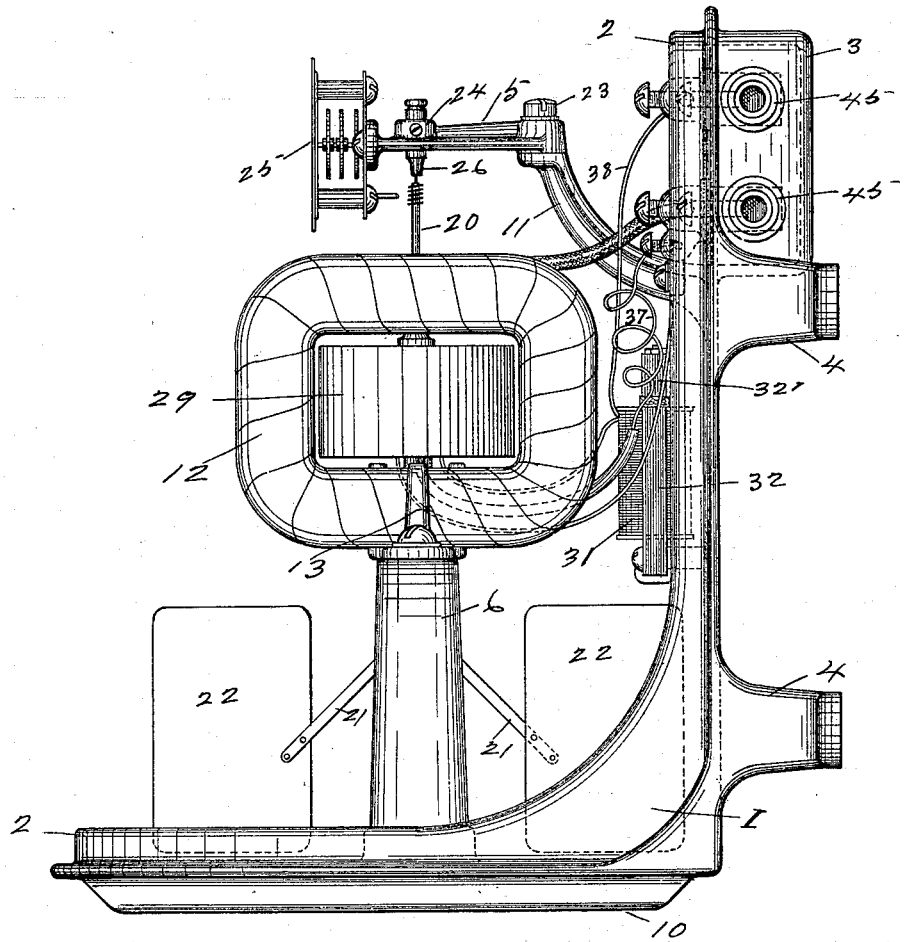
Figure 3:
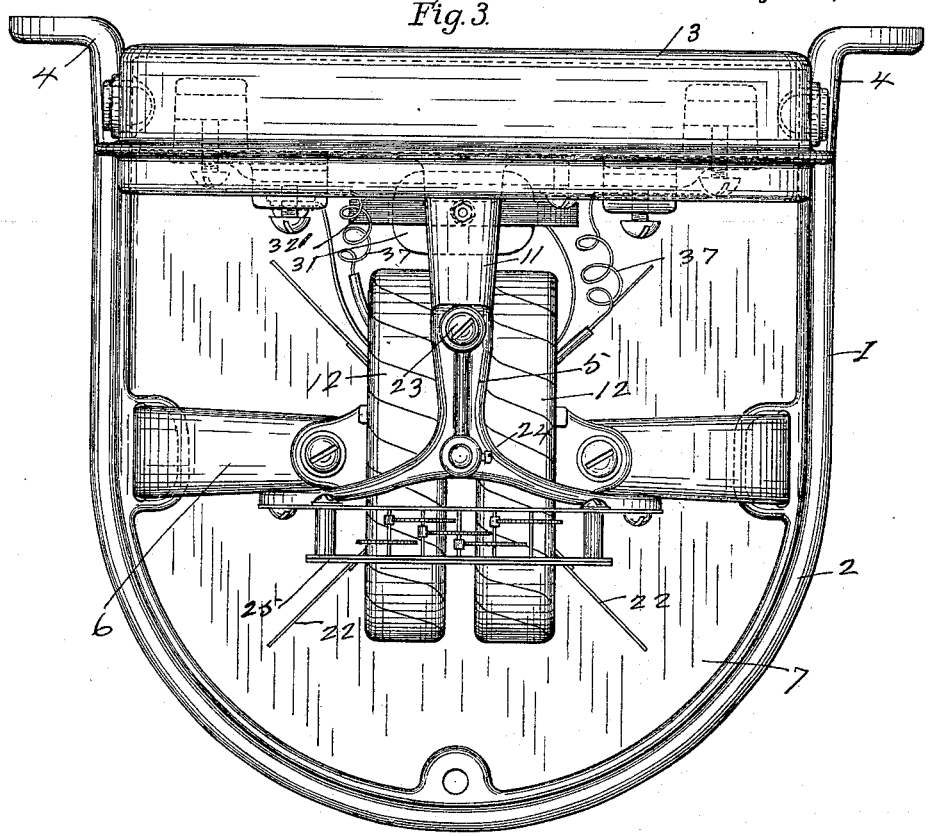
Figure 4:
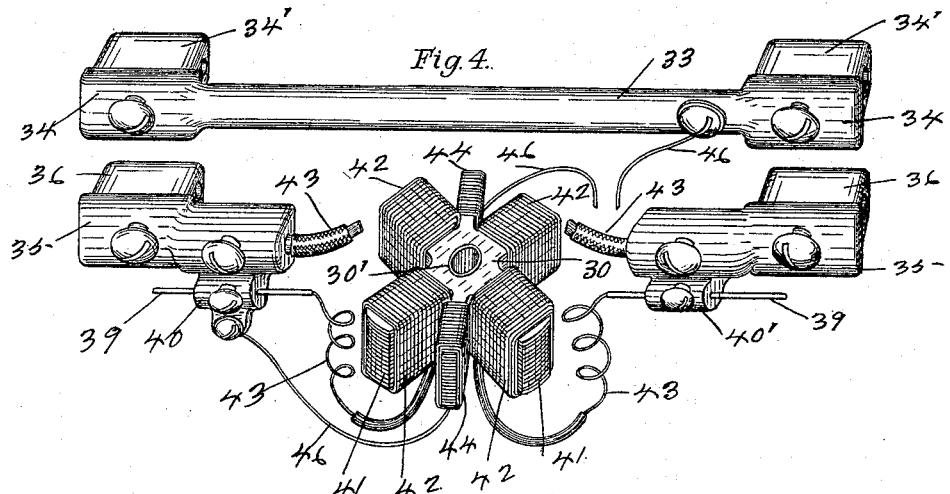

In the accompanying drawings, in which similar reference-numerals indicate like parts throughout, Figure 1 is a front view of my improved meter, partly in vertical section, to show the relative arrangement of the operative parts. Fig. 2 is a side view of my improvement. Fig. 3 is a plan view of the same. Fig. 4 is a detail of the upper and lower circuit binding-posts and the multipolar punching on which my improved shunt-wound or starting device is arranged and also shows the connections of the multipolar part with the circuit binding-posts. Figs. 5, 6, 7, 8, 9, 10, 11, and 12 are diagrammatic views of the motive part of the meter, showing the manner of applying my improvement to various types of meters of the class specified.

The metallic meter-supporting bracket 1, of any desired dimensions, has a continuous flange 2 upon its front face, an integral base 7, having strengthening-ribs 10, upon its lower face, an integral back 8, and a transverse pocket 3 open upon its front face and adapted to contain a proper insulating wooden block 9, and is provided with rearwardly-projecting apertured legs, by which the said bracket is rigidly supported to the wall when in use. The said bracket 1 has an integral upright transverse bridge 6, adapted to firmly support the field-coils 12, and is provided with an upwardly-curved and forwardly-projecting arm 11, Figs. 2 and 3, on the outer free end of which is mounted the forwardly-projecting horizontal bifurcated arm 5, rigidly secured thereto by the screw 23 and having an adjustable upper bearing 26 for the armature-spindle loosely mounted in a proper vertical perforation therein and secured in position by the set-screw 24. To the forward end of arm 5 is rigidly fixed a proper registering-train 25 by means of proper holding-screws, as shown.

The field or energizing coils 12, placed in upright parallel arrangement and slightly separated, as shown, are rigidly secured in position upon the bridge 6, approximately midway its ends, by clamps 13 and the holding-screws 13'. In a suitable vertical opening in said bridge 6, Fig. 1, is soldered or otherwise fixed a tube 14, on the upper projecting end of which is fixed the multipolar laminated iron punching 30, having a central aperture provided with an insulating-bushing 30', through which passes the rotary armature-spindle 20. To this spindle and within the said field-coil is rigidly fixed in any proper manner the cylindrical aluminium armature 29, Fig. 2, inclosing, without contact therewith, the said fixed punching 30.

On the base 7 of the bracket 1 is arranged a vertical lug 15, having a screw-threaded perforation and an undercut recess for the externally-screw-threaded head of the upright jewel-post 16, provided in its upper recessed end with a proper bearing-jewel for the lower end of the armature-spindle 20, the upper end of which has a proper worm in actuating gear with the said registering-train in the usual manner. On the said jewel-post 16 and adjacent to the said lug 15 is arranged a jam-nut 17 to keep said jewel-post in position. A coil-spring 18 is mounted on said cap 17 about said post. Upon the upper end of said jewel-post and resting upon said spring is arranged a cap 19, whose top is centrally apertured to admit the reduced lower end of said spindle 20. The said undercut recess is then filled with wax, so that the jewel-post cannot be tampered with or deranged. When it is desired to raise the armature-spindle out of contact with the jewel for shipment, the operator simply elevates both the upper adjustable bearing 26 and the cap 19 by means of the said nut 17. Directly above the said cap 19 on the said armature-shaft is fixed in any proper manner the integral oblique arms 21, on the outer ends of which are fixed the fan-blades 22, of aluminium and preferably four in number, to afford the proper retardation. To the back 8 of said bracket 1 is fixed in any proper manner the impedance-coil 31, Figs. 2 and 3, and the embraced laminated core 32, all of well-understood function and construction. The top portion 32' of said core is adjustable for the purpose of varying the impedance of said coil 31. On the front face of the said block 9 are fixed the upper binding-posts 34, united, Fig. 4, by an integral bar 33 and having lugs 34', adapted to fit proper containing-sockets in said block 9, and the lower binding-posts 35 having similar lugs 36, fitting proper sockets in said blocks.

On the four polar projections 41 of the punching 30 are wound the coils 42, Fig. 4, which are employed to actuate the meter on all loads. These coils are connected across the terminals of the series coils by the wires 43, one of the said terminals being connected to the subbinding-post 40 on one side and the other terminal to the subbinding-post 40' on the other side. For the purpose of varying the resistance of the said coils 42 in regulating the speed of the meter I introduce two straight pieces of German-silver wire into the circuit at the point where the wires 43 terminate in the said binding-posts 40 and 40'. By introducing more or less of these wires into the circuit with said coils 42 their resistance may be varied in a well-understood manner. The series coils 12 are connected to the two lower main binding-posts 35 by means of the wires 43. These terminals are sunk into the wooden block 9, which fits into the said pocket 3. In suitable openings in the ends of said pocket 3 are inserted the soft-rubber bushings 45, Fig. 2, adapted to receive the leading-in wires. (Not shown.)

Upon the diametrically opposite polar projections of said punching 30 are wound the auxiliary torque or starting coils 44, Fig. 4, which are connected in series with each other and have their outer terminals connected in multiple to the two mains, as shown, by the wires 46 and are made to include the impedance-coil 31. The axis of the coils 44 are at right angles to the axis of the series coils 12. The break in the wire 46, Fig. 4, indicates the point at which the impedance-coil 31 is inserted.

Figure 5:
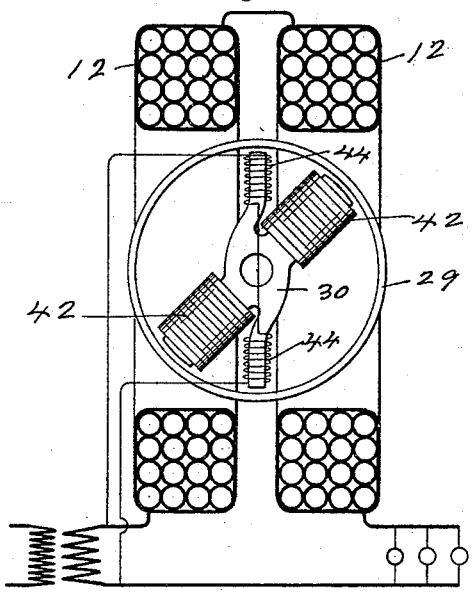
Figure 6:
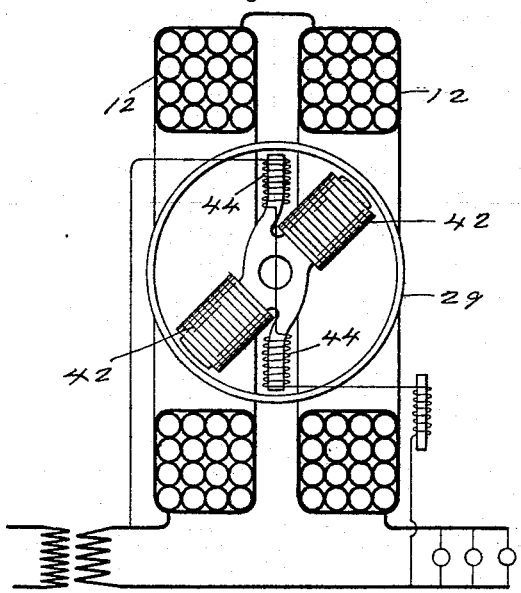
Figure 7:
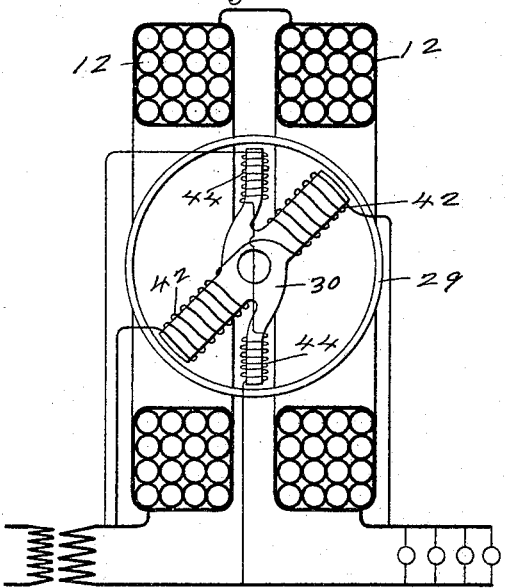
Figure 8:
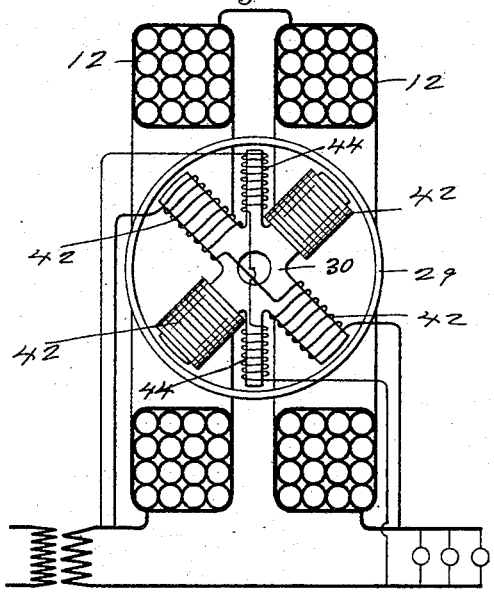
Figure 9:
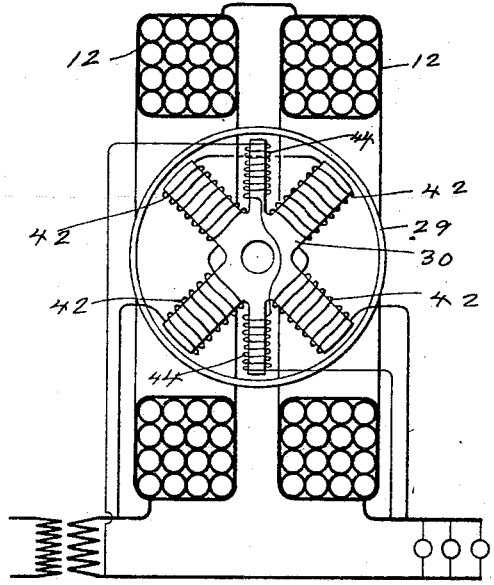
Figure 10:
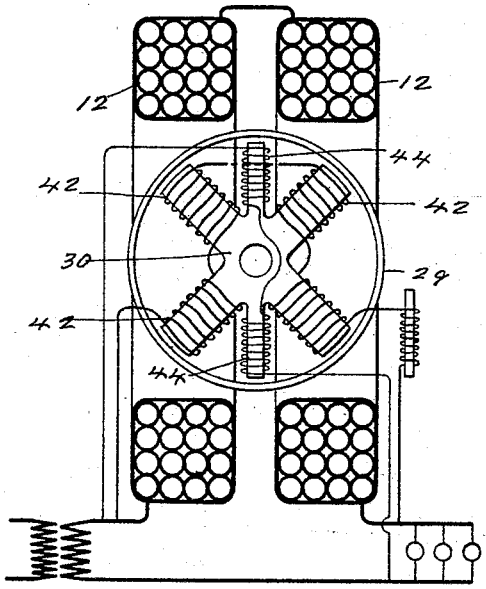
Figure 11:
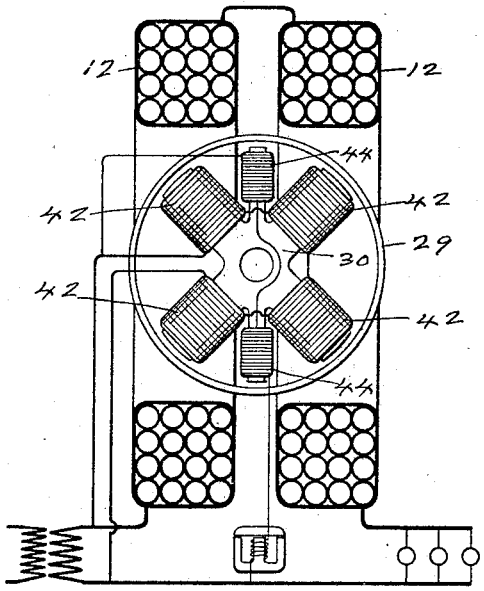
Figure 12:
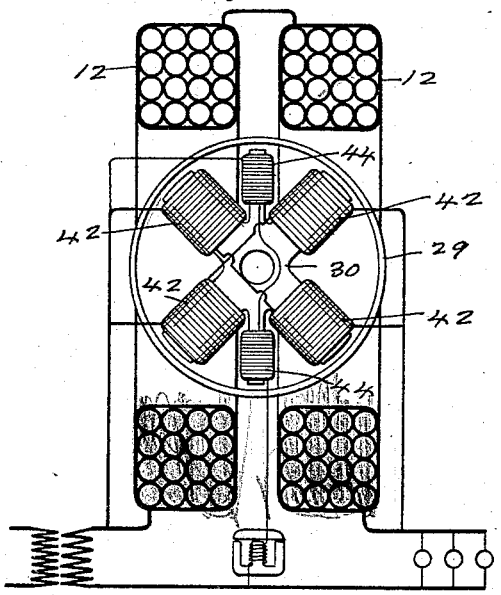

The operation of my invention thus described is, briefly stated, as follows: Referring now to Fig. 6, the cylinder 29 is actuated by the current flowing through the series coils 12 by resulting induced currents therein and is accelerated by the induced currents in the closed circuit-coils 42. When the load is very small, as where but one lamp is in use, and the torque is insufficient to actuate the said cylinder, the field set up by the auxiliary coils 44 assists in actuating the armature, for the shunt or auxiliary coils 44 are always energized, even when no current is flowing in the series coils 12 or in the closed circuit-coils 42, because they are connected to the supply-mains. The strength of field produced by said coils 44 is regulated by the self-induction of the impedance-coil 31 until the speed of the meter is correctly adjusted for minimum loads. Of course when no lamps are in use no rotation of the armature can take place, as the field set up by the said auxiliary coils is unable of itself to alone produce rotation. There is no mutual induction between the series coils 12 and the said auxiliary coils 44, as they are at right angles to each other. The impedance-coil 31 may be omitted from the circuit in which the auxiliary torque-coils are located, as shown in Fig. 5, when the line pressure is very low and all the self-induction necessary is possessed by the said auxiliary coils 44 themselves. The auxiliary torque-coils 44 may be employed in conjunction with the said coils 42, which are themselves connected in multiple to the series coils 12, as shown in Fig. 7, or the arrangement of the coils 42 (shown in Figs. 5 and 7) may be combined and arranged at right angles to each other and in combination with the said starting or torque coils, as shown in Fig. 8, or the said auxiliary coils may be used in combination with the four coils 42, which are connected in series and joined in multiple to the terminals of the energizing-coils 12, as shown in Fig. 9. In Fig. 10 I have shown a combination similar to that seen in Fig. 9, with the addition of an impedance-coil 31 in series with the said coils 42. Of course an impedance-coil may be used in both circuits—that is, in series with the said auxiliary torque-coils 44 and the said coils 42. In Fig. 11 the auxiliary starting-coils are shown with an impedance-coil, the value of which is altered or varied by varying the position of the cross-bar or keeper across its poles, the said coils 42 being connected in multiple to the mains for measuring the energy. In Fig. 12 the auxiliary or starting coils are shown in combination with the said coils 42, which are connected two sets in multiple and the common terminals in multiple to the series coils.

What I desire to secure by Letters Patent is—

1. In a meter of the class specified, the combination of an annular rotary armature; a magnetic field exterior to said armature; a plurality of magnetic fields within the armature and having intersecting axes each of which is arranged at an angle to the axis of the exterior field; and a friction-compensating magnetic axis arranged at right angles to the axis of the said exterior field.

2. An electric meter provided with an annular armature of low electrical resistance, series coils exterior to said armature, and a plurality of coils within the armature arranged on separate axes on opposite sides of the axis of the series coils, and a magnetic field acting at right angles to the axis of said series coils for the purpose of overcoming the friction of said meter.

3. In an electric induction-meter or motive device an annular rotatable armature, series coils exterior thereto, a plurality of volt-coils arranged within said armature upon intersecting axes and on opposite sides of the axis of the series coils, and an auxiliary starting coil or coils arranged upon laminated pole-pieces integral with the pole-pieces of said volt-coils, the said starting-coils being adapted to set up a magnetic field whose action is at right angles to the axes of the series coils.

4. In an electric induction-meter or motive device the combination of the series coils exterior to the armature and a plurality of volt-coils within the rotatable armature; in combination with a friction-compensating coil whose axis is at right angles to that of the axis of the series coils and adapted to be energized from the same source as the said volt-coils.

5. The combination in an electric meter of the series coils exterior to the rotatable armature; a plurality of volt-coils within the said armature whose axes are inclined to the axis of the said exterior coils; a friction-compensating coil whose axis is at right angles to that of the axis of the series coils and adapted to be energized from the same source as the said volt-coils; and an impedance-coil in series with the said compensating coil or coils.

Signed by me, at Fort Wayne, Allen county, State of Indiana, this 7th day of August, A. D. 1897.

THOMAS DUNCAN.

Witnesses:
WATTS P. DENNY,
MOLLIE E. SHREVE.